No. 775,934. Patented November 29, 1904.

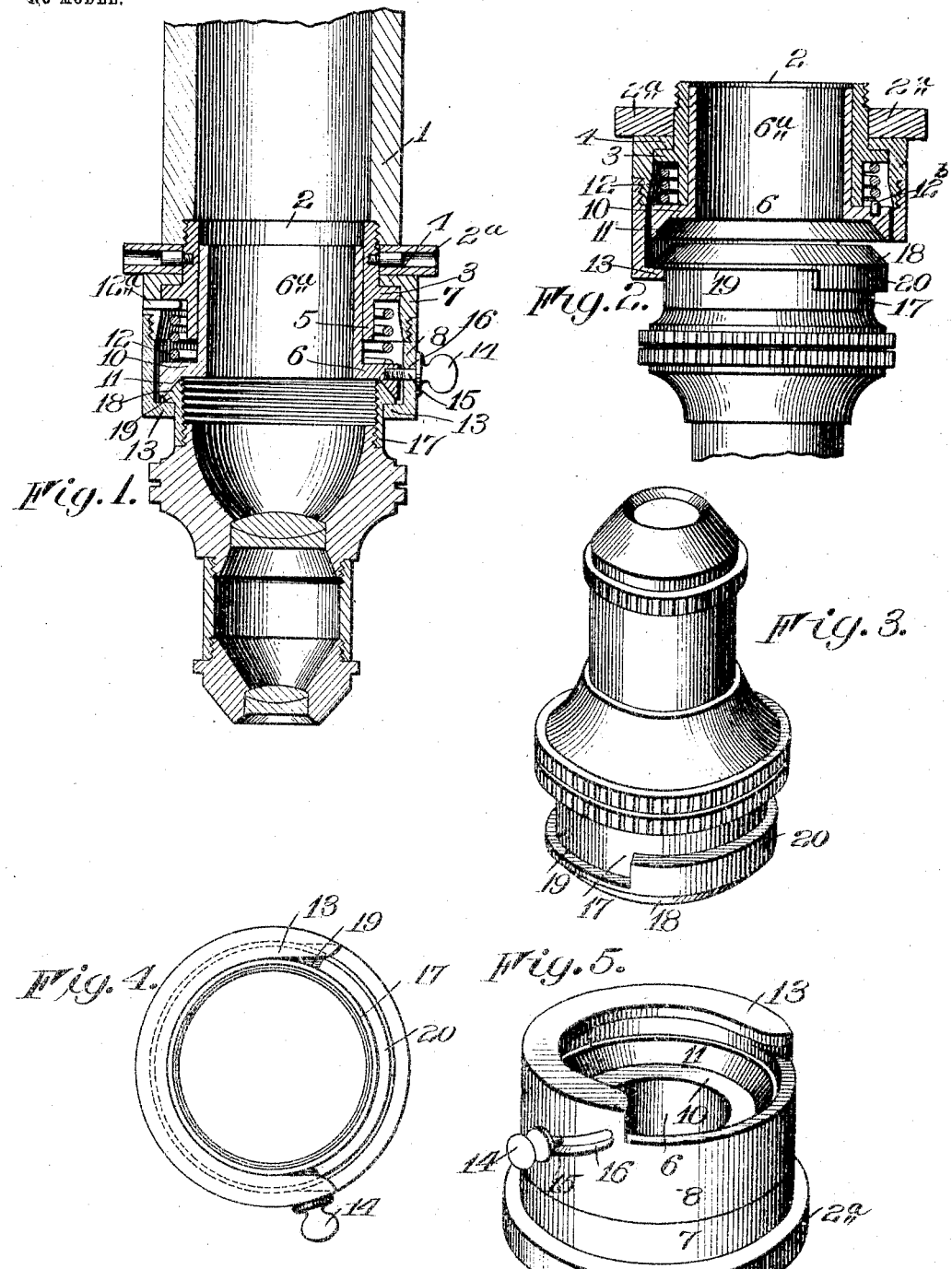

UNITED STATES PATENT OFFICE.

WILLIAM L. PATTERSON, OF ROCHESTER, NEW YORK, ASSIGNOR TO THE BAUSCH & LOMB OPTICAL COMPANY, OF ROCHESTER, NEW YORK, A CORPORATION OF NEW YORK.

OBJECTIVE-HOLDER FOR MICROSCOPES.

SPECIFICATION forming part of Letters Patent No. 775,934, dated November 29, 1904.

Application filed December 17, 1903. Serial No. 185,557. (No model.)

*To all whom it may concern:*

Be it known that I, WILLIAM L. PATTERSON, of Rochester, in the county of Monroe and State of New York, have invented certain new and useful Improvements in Objective-Holders for Microscopes; and I do hereby declare the following to be a full, clear, and exact description of the same, reference being had to the accompanying drawings, forming a part of this specification, and to the reference-numerals marked thereon.

My present invention has for its object to provide an improved lens or objective-holder for microscopes and similar instruments that may be attached to the usual nose-piece or lens-tube and which will enable the various objectives to be readily and conveniently attached to the instrument and automatically centered and positioned and which enables them to be instantly detached from the holder without liability of damage.

To these and other ends my invention consists in certain features of construction and arrangement to be hereinafter more fully described, and pointed out in the claims hereunto annexed.

In the drawings, Figure 1 is a longitudinal sectional view showing an objective connected to the lens-tube of a microscope by means of a holder embodying my invention. Fig. 2 is a view showing the objective about to be detached. Fig. 3 is a perspective view of an objective adapted to be employed with a holder embodying my invention, and Figs. 4 and 5 are detail views of the holder detached from the instrument.

In these views similar parts are designated by the same numerals of reference.

In the present embodiment of my invention, 1 designates the nose-piece of a microscope or similar instrument, the lower portion of which is internally screw-threaded, as usual, to receive the correspondingly-threaded extension of the coupling or attaching screw 2, a milled ring $2^a$ being advantageously employed to enable the device to be readily attached to the instrument. This coupling-screw is provided with a peripheral shoulder 3, arranged to rotatably engage the inner side of the flange 4 of the holder, and is also bored centrally and provided with an extension 5 to form a comparatively long bearing. In this bearing is slidingly fitted the extension $6^a$ of the relatively movable locking member 6, which latter is inclosed in a casing made up in the present instance of a pair of sections 7 and 8, screw-threaded together or otherwise united, one of said members being provided with an overhanging flange 13, against which is normally adapted to rest the shoulder 10 of the movable member 6, the under side of this shoulder being provided with a conical slot or recess 11. Between the shoulder 3 of the coupling or attaching screw and the shoulder 10 of the locking member 6 the helical compression-spring 12 is interposed, one end, $12^a$, of which is fixed to the relatively stationary casing, and the opposite end, $12^b$, of which is attached to the rotatable shoulder 10.

Connected to the shoulder 10 of the movable member is an operating projection 14, the stem 15 of which extends through an inclined slot 16, formed in the wall of the casing, the arrangement being such that when said projection is operated the stem thereof will ride in said slot, causing the locking member 6 to be retracted and simultaneously rotated, and as the ends of the compression-spring 12 are connected, respectively, to the casing and to the relatively rotatable member 6 rotation of the latter in retracting it will tend to unwind the spring, and thereby increase the amount of compression exerted by it upon the shoulder 10, the reactionary force produced by the compression and partial unwinding of the spring producing a combined rotary and direct action that will cause the locking member to automatically return to its normal position.

A portion of the flange 12 and the adjoining side of the section 5 is cut away or removed to form a socket to receive the corresponding portion carried by the objective. In the present instance an objective of the ordinary type is employed, upon the attaching end of which is threaded the adapter-ring 17, having the conical head 18 of such a size and shape as to fit the corresponding seat 11 of the movable member, an overhanging ledge 19 being formed behind the conical portion and arranged to engage the upper surface of the flange 13, an abutment 20 being also provided, if desired, to rest in the cut-away portion of the flange 13 to prevent rotation of the objective while in the socket thus formed.

An attachment of the character hereinbefore described is particularly adapted to be attached directly to the nose-piece of the microscope, and thereby eliminate the necessity of employing the multiple nose-pieces as now commonly employed, and when it is thus attached the desired objective provided with the adapter 17 may be readily inserted into the socket of the holder by the operator after the operating projection 14 has been retracted, as the retraction of this projection causes the movable member carrying the seat 11 to be withdrawn sufficiently far to permit the conical head 18 to enter between it and the flange 13 of the holder, and when the projection is released the spring 12, acting upon the movable member 6, will cause the conical seat or recess 11 to move into engagement with the corresponding conical head 18 upon the objective, accurately centering it and causing the overhanging ledge 19 to rest firmly against the flange 13, thus insuring the proper centering and positioning of the various objectives without necessitating special attention from the operator.

In carrying this invention into effect the usual objectives may be readily provided with the adapter or attaching-ring 17 to enable them to be employed in this manner or, if desired, the adapter may be rendered unnecessary by so forming the objectives as to enable them to be attached directly to the holder, and as the operation of attaching and detaching the various objectives is extremely simple and easily accomplished all liability of injury or damage to the delicate objectives and adjacent parts is entirely eliminated.

I claim as my invention—

1. In a microscope, the combination with a holder adapted to be attached to the nose-piece thereof, having a socket extending transversely of the bore and a locking device operating in said socket, of a detachable member having a portion thereof adapted to enter said socket and to be locked therein by said locking device.

2. The combination with a holder adapted to be attached to a microscope or similar instrument, having a socket formed therein, and a locking member movably mounted in said holder and having a portion thereof adapted to enter said socket, of a detachable member having a portion thereof adapted to enter said socket, and means normally tending to move said locking member into engagement with said detachable member to retain it within the socket.

3. An attachment of the character described comprising a body portion adapted to be attached to the nose-piece of a microscope having a socket formed therein and a locking member movable longitudinally within the attachment having a seat formed thereon arranged to move into said socket, of a detachable member provided with a head adapted to enter said socket, and means for moving the seat of said locking member into engagement with the head of the detachable member to retain it within the socket.

4. An attachment of the character described, comprising a holder adapted to be attached to the nose-piece of a microscope having a socket formed therein, of a detachable member having a conical head thereon adapted to enter said socket, and a locking device having a correspondingly-shaped seat formed thereon arranged to receive said head and center it in the holder.

5. An attachment of the character described comprising a casing having a socket formed therein, a locking device movably mounted within said casing and having a seat adapted to enter said socket, means normally tending to move said seat into said socket, and an operating projection located exterior to the casing and connected to the locking member by means of which the latter may be operated, of a detachable member having a portion adapted to enter said socket and to be locked therein by said locking device.

6. An attachment of the character described comprising a casing having a socket formed therein, a locking device having a recessed portion adapted to enter said socket, operating means connected to said device and normally tending to move said recessed portion into said socket, and an operating projection located exterior to the casing and connected to said device to enable it to be manipulated, of a detachable member having a portion thereof adapted to enter said socket and rest in the recessed portion of said locking device.

7. An objective-holder for microscopes comprising a casing having means for attaching it to the microscope, a socket formed in said casing, a locking device movably mounted in said casing, means normally tending to move said locking device toward said socket, and an operating projection having a portion extending through an inclined slot formed in the wall of the casing and attached to said locking device to enable it to be retracted, of a detachable member having an adapter thereon formed to enter said socket and adapted to be locked therein by said locking device.

8. An objective-holder for microscopes comprising a body portion adapted to be attached to the microscope and having a socket formed therein to receive a corresponding portion carried by the objective, of a locking device carrying a portion adapted to engage the portion of the objective entering the socket, means for normally holding said locking device against the portion in the socket to lock it therein, and an operating device located exterior to the holder by means of which said locking device may be manipulated.

9. In a microscope, the combination with a holder adapted to be attached to the nose-piece thereof having a socket formed therein, of an objective having an adapter thereon formed to enter said socket, and a locking device for retaining it therein.

10. In a microscope, the combination with a holder adapted to be attached to the nose-piece thereof and having a socket formed therein, of an objective, an adapter thereon having a head formed to enter said socket, and a locking device for centering and retaining said adapter within said socket.

11. An objective-holder for microscopes, comprising a body portion adapted to be attached to the nose-piece of the microscope, and having a recess or socket formed therein, and a locking or retaining device adapted to operate in the socket, of an adapter threaded to receive the objective and having a head adapted to enter the socket of the holder and to be retained therein by said locking device.

12. In a microscope attachment, the combination with a holder adapted to be attached to the nose-piece thereof and having a socket formed therein, of an objective, an adapter detachably connected thereto and adapted to enter said socket, and a locking device for centering and retaining it therein.

13. In a microscope attachment, the combination with a holder adapted to be attached to the nose-piece thereof, and having a socket formed therein, of an objective, an adapter carried thereby having a conical head adapted to enter said socket, and a locking device having a recessed portion adapted to engage said head to center it within the socket.

14. An adapter for microscopes comprising an annular body portion adapted to be attached to an objective and having a cone-shaped head, a portion of which forms a laterally-projecting shoulder on the body portion.

15. The combination with a holder adapted to be attached to the nose-piece of a microscope having an aperture formed therein, a flange or shoulder adjacent the aperture, and a locking device having a recessed seat thereon opposite said shoulder, of a detachable member having a head thereon adapted to enter said aperture and having a laterally-projecting portion arranged to be held against said shoulder by said locking device.

16. The combination with a holder adapted to be attached to the nose-piece of a microscope having a central bore and an annular flange or shoulder partially encircling it, a portion thereof being cut away to form a socket, a locking device mounted in said holder having a seat thereon movable relatively to said shoulder, and means connected to said locking device and normally tending to move its seat toward said shoulder, of an adapter having a head thereon formed to enter the socket and adapted to engage the recessed seat of the locking device and to be thereby held against said shoulder.

17. An objective-holder for microscopes comprising a hollow casing, an attaching-screw revolubly mounted in said casing and adapted to enter the nose-piece of a microscope, a socket formed in the casing opposite the screw, and a locking device having a portion thereof slidingly mounted in an aperture in said screw and having a seat formed thereon adapted to enter said socket, of an objective carrying an adapter formed to enter said socket and arranged to be retained therein by said locking device.

18. An objective-holder for microscopes comprising a casing, means for attaching it to a microscope and an aperture or socket formed therein to receive a corresponding portion of the objective, a locking device loosely mounted in said casing and having a seat thereon adapted to engage the portion of the objective within the socket, and a coiled spring having its ends attached respectively to the locking device and a stationary part of the casing and adapted to exert a combined rotary and direct action tending to move the seat of the locking device into the socket, and an operating handle or projection attached to the locking device and extending through an inclined slot in the wall of the casing.

19. An objective-holder for microscopes comprising a hollow casing, a centrally-bored attaching-screw revolubly mounted therein, and provided with the operating-ring by means of which it may be attached to the nose-piece of the microscope, a locking device mounted within the casing having an extension guided in the bore of the attaching-screw and having an enlarged portion provided with a recessed seat, a socket formed in the casing and a shoulder adjacent thereto and opposite the seat of the locking device, and means normally tending to move said locking device toward said shoulder.

WILLIAM L. PATTERSON.

Witnesses:
ERNST WALTZ,
JOHN REMEIN.